US010256550B2

(12) United States Patent
Zeine et al.

(10) Patent No.: US 10,256,550 B2
(45) Date of Patent: Apr. 9, 2019

(54) DYNAMIC ACTIVATION AND DEACTIVATION OF SWITCHES TO CLOSE AND OPEN SLOTS IN A WAVEGUIDE DEVICE

(71) Applicant: Ossia Inc., Bellevue, WA (US)

(72) Inventors: Hatem Ibrahim Zeine, Bellevue, WA (US); Seyed Ali Malek Abadi, Bellevue, WA (US); Alireza Pourghorban Saghati, Los Gatos, CA (US); Prithvi Shylendra, Seattle, WA (US)

(73) Assignee: Ossia Inc., Bellevue, WA (US)

( * ) Notice: Subject to any disclaimer, the term of this patent is extended or adjusted under 35 U.S.C. 154(b) by 30 days.

(21) Appl. No.: 15/690,489

(22) Filed: Aug. 30, 2017

(65) Prior Publication Data
US 2019/0067825 A1   Feb. 28, 2019

(51) Int. Cl.
| | | |
|---|---|---|
| *H01Q 13/20* | (2006.01) | |
| *H01Q 13/22* | (2006.01) | |
| *H01Q 1/50* | (2006.01) | |
| *H02J 50/20* | (2016.01) | |
| *H01Q 21/00* | (2006.01) | |

(52) U.S. Cl.
CPC ............ *H01Q 13/22* (2013.01); *H01Q 1/50* (2013.01); *H01Q 21/0006* (2013.01); *H02J 50/20* (2016.02)

(58) Field of Classification Search
USPC .................................................. 343/777, 771
See application file for complete search history.

(56) References Cited

U.S. PATENT DOCUMENTS

| | | | |
|---|---|---|---|
| 4,229,745 A | | 10/1980 | Kruger |
| 5,717,411 A | * | 2/1998 | Knop ..................... H01Q 13/22 |
| | | | 333/237 |
| 5,940,030 A | * | 8/1999 | Hampel ............ H01Q 21/0006 |
| | | | 333/161 |
| 6,518,864 B1 | * | 2/2003 | Ito .......................... H01P 3/003 |
| | | | 333/238 |
| 6,542,654 B1 | | 4/2003 | Miller et al. |
| 7,142,165 B2 | | 11/2006 | Sanchez et al. |
| 8,897,695 B2 | * | 11/2014 | Becker ................... A62C 35/60 |
| | | | 455/3.01 |
| 9,385,435 B2 | * | 7/2016 | Bily ....................... H01Q 13/22 |
| 9,490,535 B2 | * | 11/2016 | Boutayeb ................. H01Q 3/24 |

(Continued)

FOREIGN PATENT DOCUMENTS

CN           102946006 A      2/2013

*Primary Examiner* — Jean B Jeanglaude (57) ABSTRACT

Systems and methods are described for operating a waveguide device having multiple slots, each slot having one or more switches. The waveguide device receives, from a circuit controller, an instruction to dynamically deactivate one or more switches to open selected ones of the multiple slots at determined locations in the waveguide device and to dynamically activate one or more switches to close selected ones of the multiple slots at determined locations in the waveguide device, wherein the circuit controller is communicatively coupled to each of the switches on the waveguide device. The waveguide device transmits a wave in a target direction based at least in part on the locations of the open selected ones of the multiple slots at the determined locations in the waveguide device.

20 Claims, 7 Drawing Sheets

(56) References Cited

U.S. PATENT DOCUMENTS

2001/0026668 A1    10/2001  Yamada
2013/0328739 A1*   12/2013  Rofougaran ........... H01Q 1/248
                                                       343/777

* cited by examiner

DYNAMIC ACTIVATION AND DEACTIVATION OF SWITCHES TO CLOSE AND OPEN SLOTS IN A WAVEGUIDE DEVICE

BACKGROUND

In some wireless communication and power transmission systems, various antennas may be implemented, each having a phase, which may be excited with other phases to direct a radiation at a certain angle. To phase the antenna, a phase-shifter may be used. However, phase-shifters are often lossy, difficult to construct, have a limited bandwidth, expensive, and are inflexible at shifting the direction of a wave since the phase-shifter changes the direction of a wave in fixed increments.

Alternatively, wireless communication systems and power transmission systems typically require functionality of waveguides to convey electromagnetic waves between transmitters and receivers. Under some circumstances, a leaky-waveguide may be used to direct the wave at a specified angle. The leaky-waveguide can therefore be used by an antenna to direct a beam at a selected target based on the specified angle. One common structure that enables this directivity by the leaky-waveguide is a slotted waveguide. The slotted waveguide typically includes slots placed at fixed locations along the length of the waveguide. These fixed locations of the slots are generally determined based on a fraction of the wavelength, such as at every half of a wavelength.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

SUMMARY

In one embodiment, a method of operating a waveguide device having multiple slots, each slot having one or more switches is provided. The waveguide device is communicatively coupled to a circuit controller. The method includes receiving, from a circuit controller, an instruction to dynamically deactivate one or more switches to open selected ones of the multiple slots at determined locations in the waveguide device and to dynamically activate one or more switches to close selected ones of the multiple slots at determined locations in the waveguide device, wherein the circuit controller is communicatively coupled to each of the switches on the waveguide device. The method further includes the waveguide device transmitting a wave in a target direction based at least in part on the locations of the open selected ones of the multiple slots at the determined locations in the waveguide device.

While multiple embodiments are disclosed, still other embodiments of the present invention will become apparent to those skilled in the art from the following detailed description, which shows and describes illustrative embodiments of the invention. As will be realized, the invention is capable of modifications in various aspects, all without departing from the scope of the present invention. Accordingly, the drawings and detailed description are to be regarded as illustrative in nature and not restrictive.

DETAILED DESCRIPTION

Techniques are described herein for waveguide devices in wireless transmission environment applications. More specifically, embodiments of the present disclosure describe techniques for dynamically deactivating and activating switches in the waveguide device to close and open selected slots at determined locations in the waveguide.

A common structure that allows directivity of an electromagnetic wave is a slotted waveguide. The slotted waveguide typically includes slots placed at fixed locations along the length of the waveguide. These fixed locations of the slots are generally determined based on their location and spacing which is a fraction of the wavelength, such as at every half of a wavelength. Therefore, the location of the slots determines the beam radiation angle toward a target. Further, in such systems, movable and accurate locations of the slots on the waveguide based on the angle of the target in a dynamic environment is necessary to ensure effective and efficient service.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but no other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Figure 1:
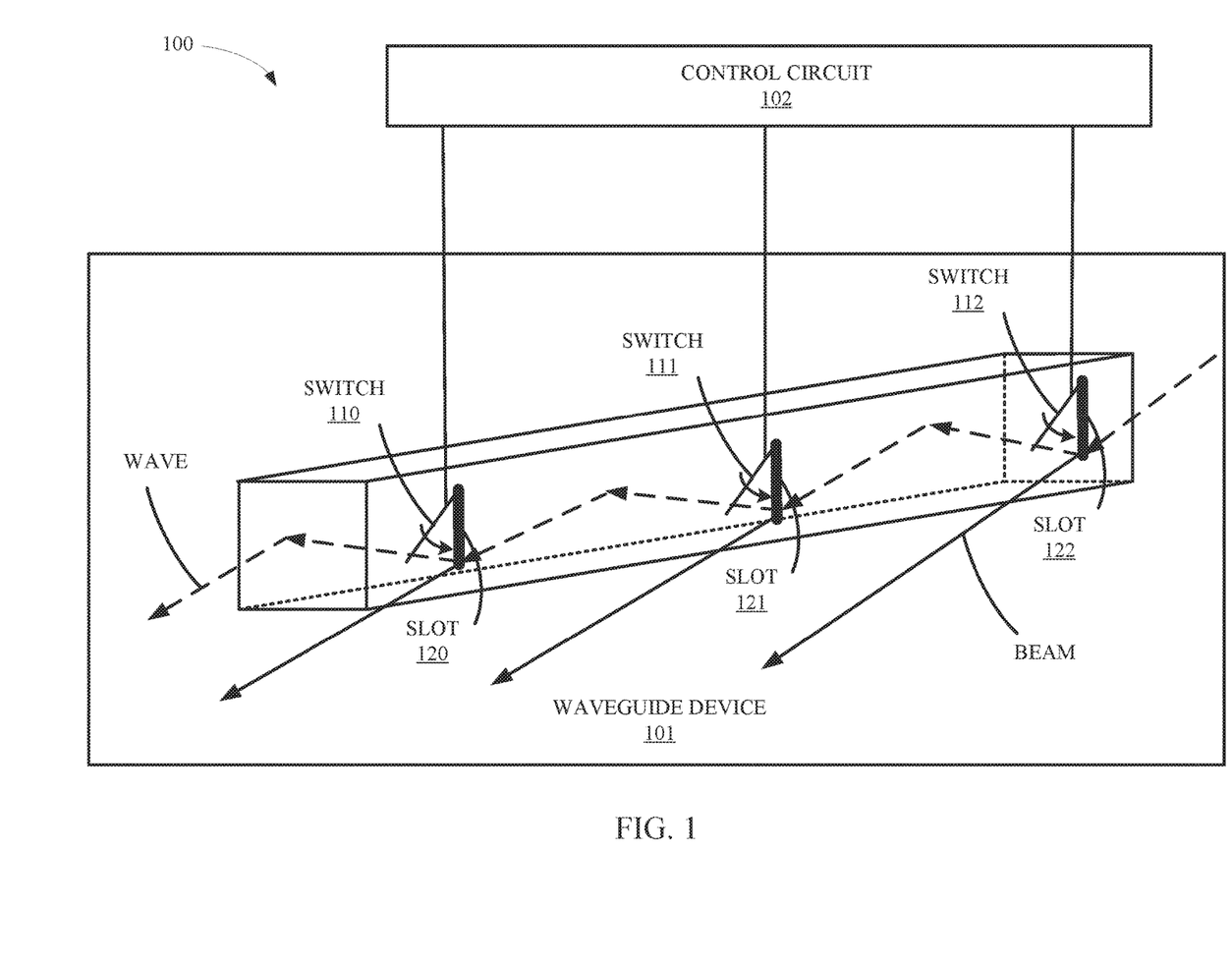
FIG. 1 is a diagram illustrating an example waveguide transmission environment depicting dynamic activation and deactivation of switches to open and close slots on a waveguide device within the environment in accordance with an embodiment.

FIG. 1 depicts a block diagram including an example wireless transmission environment 100 illustrating dynamic switch deactivation and activation on a waveguide device. More specifically, FIG. 1 illustrates an example wireless transmission environment 100 in which includes waveguide device 101 communicatively coupled to control circuit 102. Waveguide device 101 is configured to receive and transmit a wave through slots 120-122 based on the activation status of switches 110-112. Components of an example waveguide device 101 are shown and discussed in greater detail below.

As shown in the example of FIG. 1, waveguide device 101 includes a wave as indicated by the dashed-line arrows. As the wave moves through waveguide device 101, beams, as indicated by the solid-lined arrows, are transmitted through slots 120-122. Each of the multiple slots 120-122 includes one or more switches, such as switches 110-112. As discussed herein, the one or more switches 110-112 are communicatively coupled to circuit controller 102 for operation thereof.

Waveguide device 101 can be used to convey electromagnetic waves between transmitters and receivers. In wireless transmission system 100, various antennas may be implemented, each having a phase, which may be excited with other phases to direct a wave at a certain angle. Waveguide device 101 may comprise a leaky-waveguide used to direct the wave at a specified angle. Waveguide device 101 can therefore be used by an antenna to direct a beam at a selected target based on the specified angle. A waveguide is a form of transmission line comprising a metal, hollow tube. The waveguide can be analyzed using electromagnetic (EM) theory. The larger the size of the waveguide, the lower the operating frequency. Waveguides pass signals above a specific frequency, known as the cut-off frequency, which is dependent upon the waveguide dimensions. Due to the mechanical constraints, waveguides are typically used in the microwave regime (sizes typically range between sub-millimeter to tens of centimeters depending on the frequency of operation).

Waveguide device 101 is a slotted waveguide which includes slots 120-122 placed at fixed locations along the length of waveguide device 101. Slots 120-122 control the waves exiting waveguide device 101 based on the placement of the wave phase reflecting through the internal cavity of waveguide device 101. These fixed locations of the slots are generally determined based on a fraction of the wavelength, such as at every half of a wavelength (212). Therefore, the location of slots 120-122 determine the location of the radiated beam angle. Waveguide device 101 may be a rectangular slotted-waveguide, a circular slotted-waveguide, a substrate integrated waveguide, circuit board strip-lines, or some other waveguide capable of directing a beam using slots.

Control circuit 102 is configured to provide control and intelligence to the waveguide device components. Control circuit 102 may comprise one or more processors, memory units, etc., and direct and control the various data and power communications. Control circuit 102 can direct data communications on a data carrier frequency. Likewise, control circuit 102 can direct wireless transmission system 100 to communicate with receiving devices as discussed herein. The data communications can be, by way of example and not limitation, Bluetooth™, Wi-Fi™, ZigBee™, etc. Other communication protocols are possible.

Switches 110-112 may be an electric diode, an RF Microelectromechanical (MEM) switch, or any other switch or component capable of mechanically or electronically opening and closing slots 120-122 on wireless device 101. Switches 110-112 may include a two-terminal electronic component that conducts primarily in one direction with low resistance to the current in one direction, and high resistance in the other. Examples of switches include, but are not limited to, PIN and varactor diodes, GaAs field-effect transistor (FET) based switches, automatic mechanical high precision RF switches, and monolithic integration of RF MEMS switches with RF circuits. A PIN diode has a wide, un-doped, resistive intrinsic semiconductor region situated between a p-type and n-type regions which distinguishes it from the conventional PN diodes and gives its unique characteristics. Switches 120-122 may also include integrated switches (which typically are implemented on a Silicon or glass substrates) or mechanical switches (which are typically based on aluminum alloys and stainless steel).

Wireless transmission system 100 can include multiple antennas, e.g., an antenna array including hundreds or thousands of antennas, which are capable of delivering wireless signals to wireless receiving devices. In some embodiments, the antennas are adaptively-phased radio frequency antennas. The wireless transmission system 100 is capable of determining the appropriate phases with which to deliver a wave signal to a receiver device. The wave can be configured to emit a signal (e.g., continuous wave or pulsed transmission signal) from multiple antennas using multiple waveguides at a specific phase relative to each other.

It is appreciated that the use of the term "waveguide device" does not necessarily limit the waveguide device to any specific structure. That is, the waveguide device does not need to be structured in a specific slotted form or geometry. Furthermore, as used herein the term "waveguide" or "waveguide device" may be used to include related and peripheral circuitry for signal generation, reception and transmission, such as radios, digital logic and modems.

Although not illustrated, each component wireless transmission system 100 on the environment, can include control and synchronization mechanisms, e.g., a data communication synchronization module. The wireless transmission system 101 can be connected to a power source such as, for example, a power outlet or source connecting the wireless power transmission systems to a standard or primary alternating current (AC) power supply in a building. Alternatively, or additionally, wireless transmission system 101 can be powered by a battery or via other mechanisms, e.g., solar cells, etc.

As described herein, wireless transmission system 100 can be any system and/or device, and/or any combination of devices/systems that can establish a connection with another device, a server and/or other systems. In some embodiments, the wireless transmission system 100 can be, but is not limited to, a video game controller, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. By way of example and not limitation, wireless transmission system 100 can also be any wearable device such as smart watches, necklaces, rings or even devices embedded on or within the client.

Figure 2:
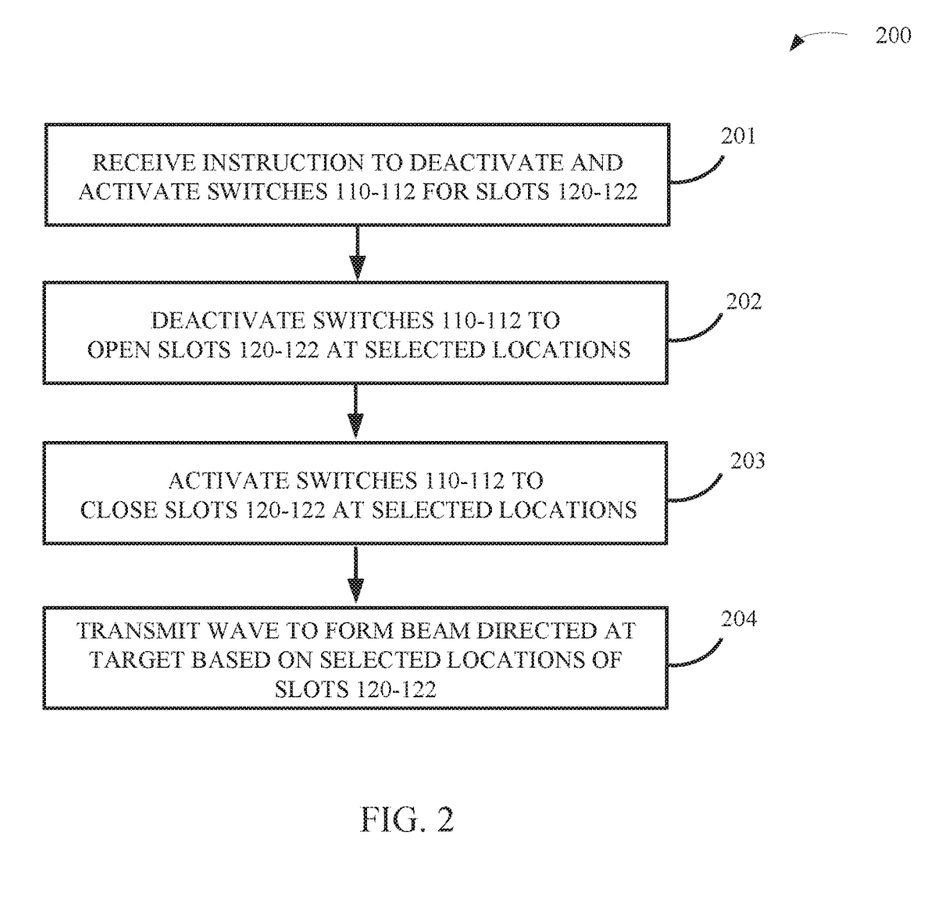
FIG. 2 is a flow diagram illustrating example operations of dynamic activation and deactivation of switches to open and close slots on a waveguide device in accordance with an embodiment.

FIG. 2 is a flow diagram 200 illustrating is a flow diagram illustrating example operations of dynamic activation and deactivation of switches to open and close (e.g., electronically and/or physically) slots on a waveguide device in accordance with an embodiment. As discussed, in some embodiments, waveguide device 101 may be used for wireless communication transmission waves, wireless power transmission waves, or dual-purpose data/power transmission waves. In an initial step, waveguide device 101 receives (201), from circuit controller 102, an instruction to dynamically deactivate one or more switches 110-112, such as switches 110 and 112, to open selected ones of multiple slots 120-122, such as slots 120 and 122, at determined locations in waveguide device 101. Waveguide device 101 also receives (201), from circuit controller 102, an instruction to dynamically activate one or more switches 110-112 to close selected ones of multiple slots 120-122 at determined locations in the waveguide device.

Continuing with the example of FIG. 2, wireless device 101 then deactivates (202) the one or more switches 110-112 to open selected ones of multiple slots 120-122 at determined locations in waveguide device 101. Waveguide device 101 also activates (203) one or more switches 110-112 to close selected ones of multiple slots 120-122 at determined locations in waveguide device 101. Waveguide device 101 transmits (204) a wave in a target direction based at least in part on the locations of the open selected ones of multiple slots 120-122 at the determined locations in waveguide device 101.

In some embodiments, waveguide device 101 may comprise a rectangular slotted-waveguide. In other implementations, waveguide device 101 may comprise a circular slotted-waveguide. In yet another implementation, waveguide device 101 may comprise a substrate integrated waveguide. In some embodiments, switches 110-112 comprise electronic diodes. In other implementations, switches 110-112 comprise RF Microelectromechanical (MEM) switches.

Figure 6:
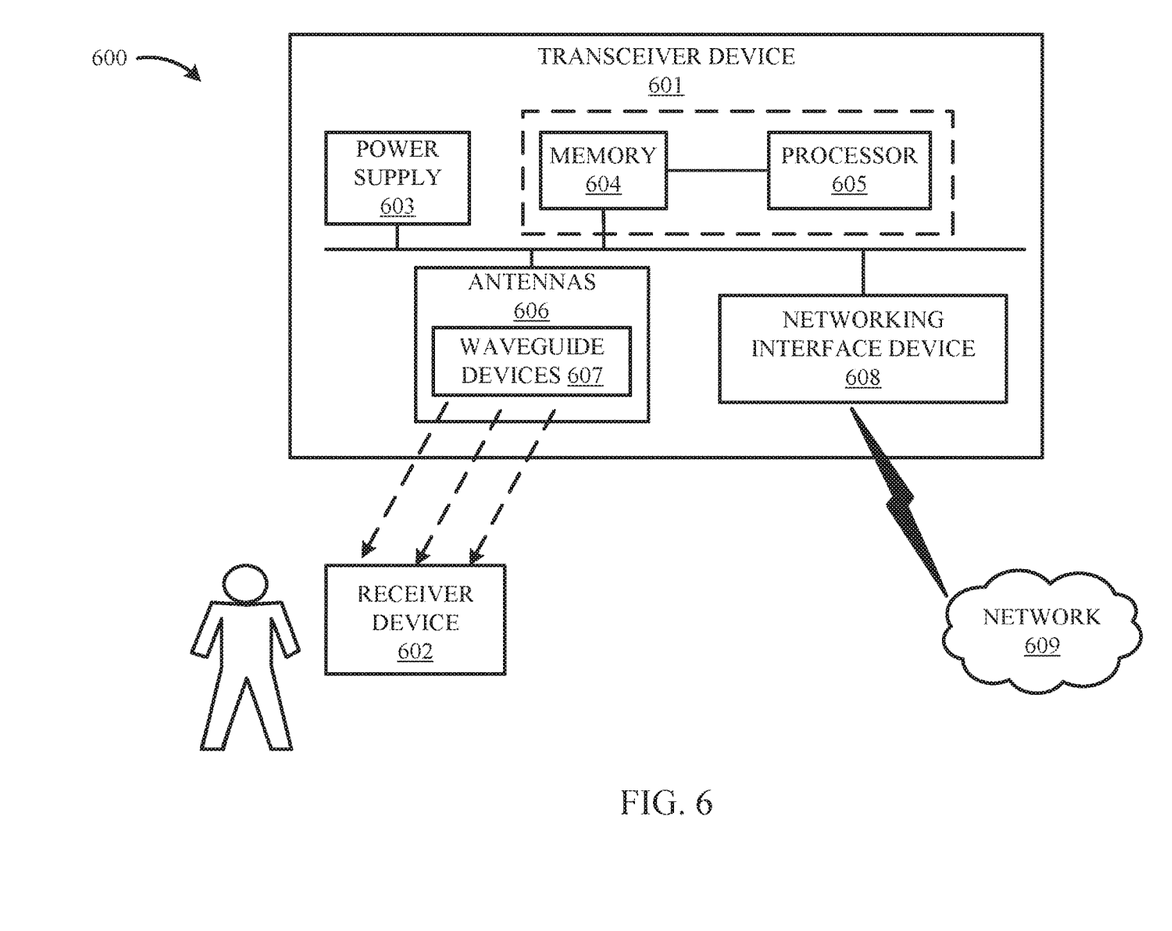
FIG. 6 is a diagram illustrating an example wireless communication signal delivery environment in accordance with an embodiment.

In some example embodiments, waveguide device 101 transmits a wireless communication signal in the target direction based at least in part on the locations of the selected ones of multiple slots 120-122 at the determined locations in waveguide device 101, as further illustrated in FIG. 4. In other example embodiments, waveguide device 101 transmits a wireless power wave in the target direction based at least in part on the locations of the selected ones of multiple slots 120-122 at the determined locations in waveguide device 101, as illustrated in FIG. 6.

In some example embodiments, waveguide device 101 is communicatively coupled to a processor. In this example embodiment, the processor computes the locations of the selected ones of multiple slots 120-122 in waveguide device 101 based at least on a waveform characteristic and a transmission path of the wave to a receiver device. Furthermore, in this implementation, the processor assigns, based on the computed locations of the selected ones of multiple slots 120-122, the instruction to dynamically deactivate one or more switches 110-112 to open selected ones of multiple slots 120-122 at the computed locations in the waveguide device.

In yet another example embodiment, waveguide device 101 is communicatively coupled to a processor. In this example embodiment, the processor detects a modification parameter of at least one waveform characteristic and transmission path of the wave to a receiver device. Additionally, in this implementation, the processor computes, based on the modification parameter, the modified locations of the selected ones of multiple slots 120-122 in waveguide device 101. Furthermore, the processor assigns, based on the computed modified locations of the selected ones of multiple slots 120-122, the instruction to dynamically deactivate one or more switches 110-122 to open selected ones of multiple slots 120-122 at the computed modified locations in waveguide device 101.

Figure 3:
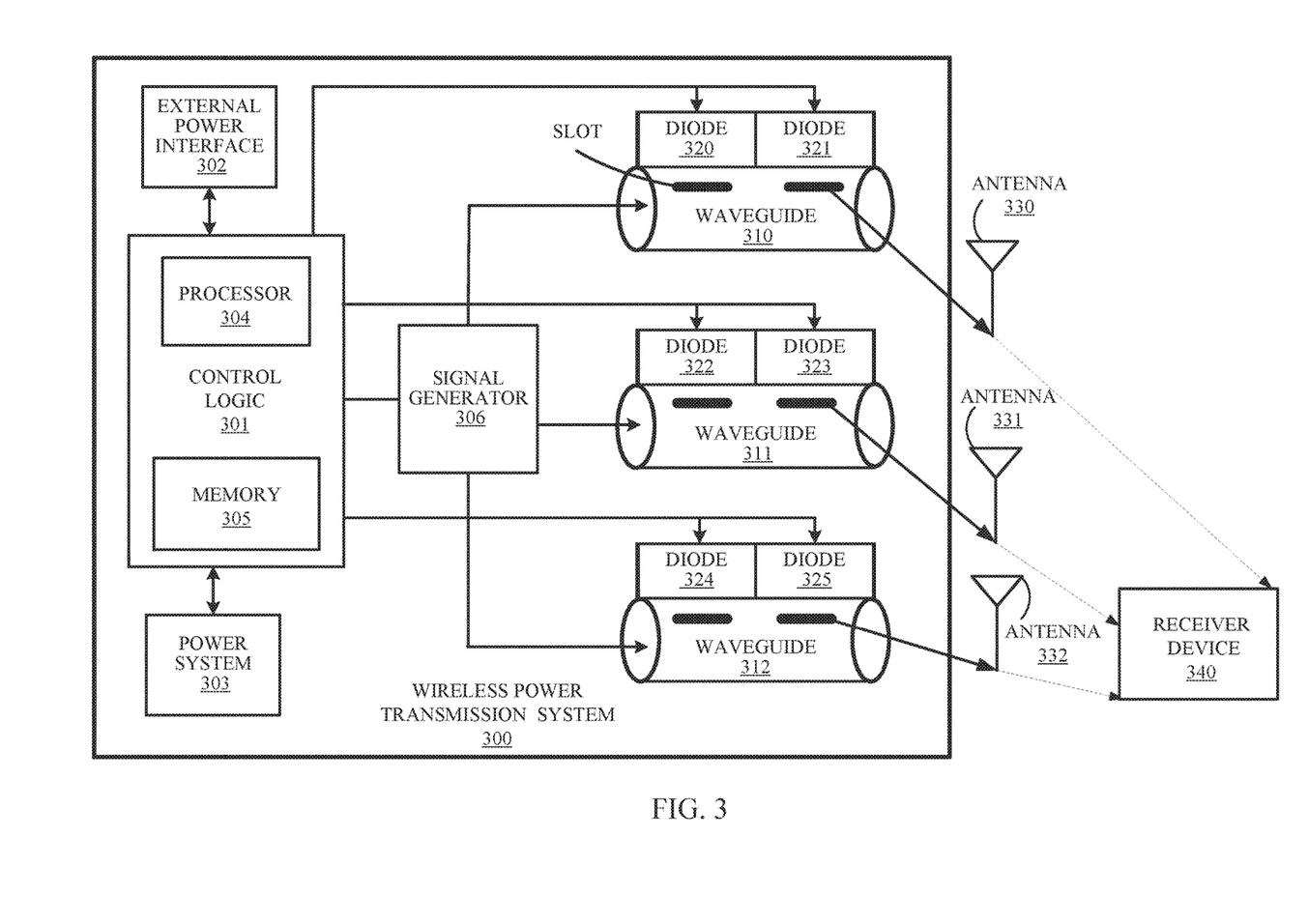
FIG. 3 is a diagram illustrating an example wireless power delivery environment in accordance with an embodiment.

FIG. 3 is a block diagram illustrating example components of a wireless power transmission system 300, in accordance with an embodiment. As illustrated in the example of FIG. 3, the wireless power transmission system 300 includes a control logic 301, external power interface 302, a power system 303. Control logic 301 includes processor 304 and memory 305. Additionally, wireless power transmission system 300 includes signal generator 306 transmitting waves to circular slotted-waveguides 310-312. Each of circular slotted-waveguides 310-312 include diodes, such as diodes 320-325. As can be seen by the solid lines below each of diodes 320-325, the slots are arranged parallel to the length of circular waveguides 310-312, where each of the slots may be closed by activating diodes 320-325, and opened by deactivating diodes 320-325. Additional components are also possible. For example, in some embodiments antennas 330-332 are included for transmitting the waves directed by circular slotted-waveguides 310-312 to receiver device 340.

Control logic 301 is configured to provide control and intelligence to the array components. Control logic 301 may direct and control the various data and power communications. Signal generator 306 can compute a signal wave comprising power or data communications on a data carrier frequency. The signal wave can be Bluetooth™, Wi-Fi™ ZigBee™, etc., including combinations or variations thereof. In some embodiments, logic 301 can also determine that receiver device 340 has relocated and compute a slot reconfiguration based on modified parameters for receiver device 340.

The external power interface 302 is configured to receive external power and provide the power to various components. In some embodiments, the external power interface 302 may be configured to receive a standard external 24 Volt power supply. In other embodiments, the external power interface 302 can be, for example, 120/240 Volt AC mains to an embedded DC power supply which sources the required 12/24/48 Volt DC to provide the power to various components. Alternatively, the external power interface could be a DC supply which sources the required 12/24/48 Volts DC. Alternative configurations are also possible.

In operation, control logic 301, which controls the wireless power transmission system 300, receives power from a power source over external power interface 302 and is activated. Control logic 301 may then enter a default "discovery" mode to identify available wireless receiver clients within range of the wireless power transmission system. When a client is found, the antenna elements on the wireless power transmission system power on, enumerate, and (optionally) calibrate. Next, control logic 301 determines a waveguide slot configuration based on the various wave characteristics and geometry of receiver device 340. Control logic 301 then transfers instructions to activate or deactivate diodes 320-325 on each of the slots located at locations along circular slotted-waveguides 310-312.

Once each of diodes 320-325 receives the instructions from control logic 301, diodes 320-325 either activate to close their associated slot or deactivate to open their associated slot. Signal generator 306 then generates and transfers the power waves to circular slotted-waveguides 310-312. Based on the open and closed slots, circular slotted-waveguides 310-312 transmit the power waves at an angle directed toward receiver device 340. As discussed herein, the wave angles for each of circular slotted-waveguides 310-312 are dynamically modified based on the activation status of each of diodes 320-321, as determined by control logic 301.

Figure 4A:
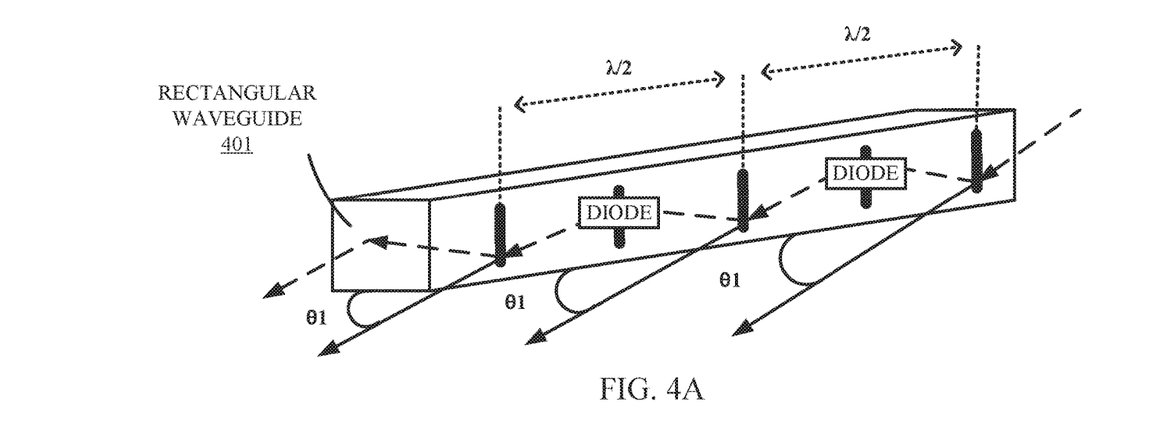
FIG. 4A is a diagram illustrating an example waveguide device in accordance with an embodiment.
Figure 4B:
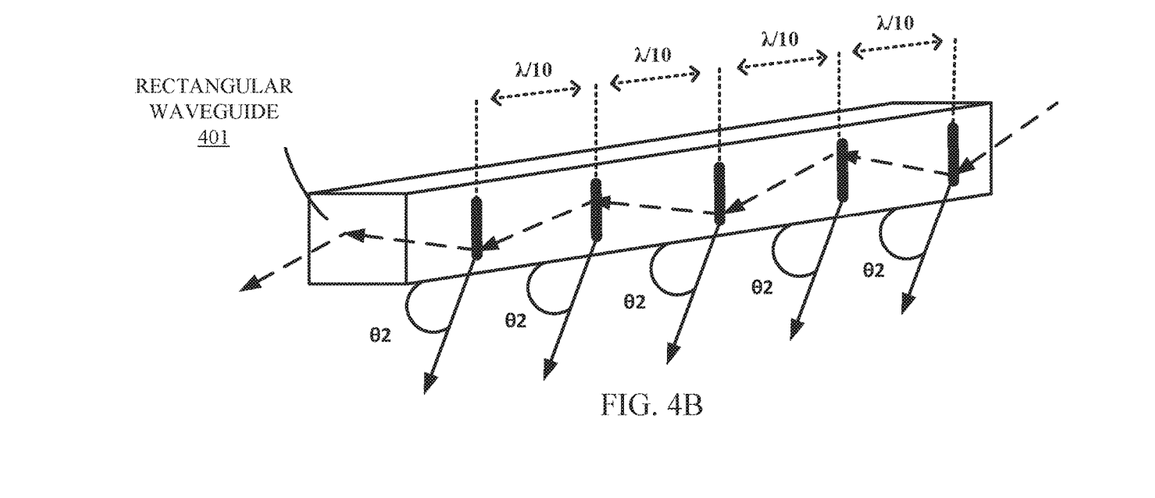
FIG. 4B is a diagram illustrating an example waveguide device in accordance with an embodiment.

FIGS. 4A and 4B depict rectangular waveguides for dynamically activating and deactivating diodes to open and close slots on a waveguide device in accordance with an embodiment. Referring to FIG. 4A, rectangular waveguide 401 includes a wave, as indicated by the dotted-lined arrows, and beams radiating out of open slots (e.g., waves are escaping from the waveguide at various phases based on the waveform characteristics), as indicated by the solid-lined arrows. Open slots are indicated by solid vertical holes while closed slots are indicated by solid vertical holes covered by a diode. It should be noted that open slots also comprise one or more diodes. However, deactivated diodes have been omitted for clarity. In this example, each open slot is located every half of a wavelength ($\lambda/2$). This particular spatial distance between each open slot results a beam angle (e.g., θ1). Referring next to FIG. 4B, all slots for rectangular waveguide 401 are now open with all diodes being deactivated. In this particular example, the open slots are located every tenth of a wavelength ($\lambda/10$). This particular spatial distance between each open slot results a beam angle (e.g., θ2).

The position, size, shape and orientation of the slots, in addition to the type/shape of the slotted waveguide and its frequency of operation govern the radiation pattern, and determine if the slots radiate in the first place. The current distribution around the slots (found from EM analysis) determines how the radiation pattern forms. For example, slots are not typically introduced at the center of the waveguide since the perpendicular component of the current density is equal to zero at the center which yields no radiation. However, if the slots are displaced from the waveguide's center, the current will have a magnitude and a distribution around the slot which gives rise to radiation. The distance from the edge (in the case of rectangular waveguide) determines the magnitude of the current density. The power radiated by the slots may then be modified by placing the slots closer or farther from the waveguide's centerline. In this manner, the radiation pattern and beam-width may be manipulated by modifying the excitation and phase delay to each slot. It should also be noted that varying the lengths of the slots gives rise to a change in the phase delay.

Figure 5:
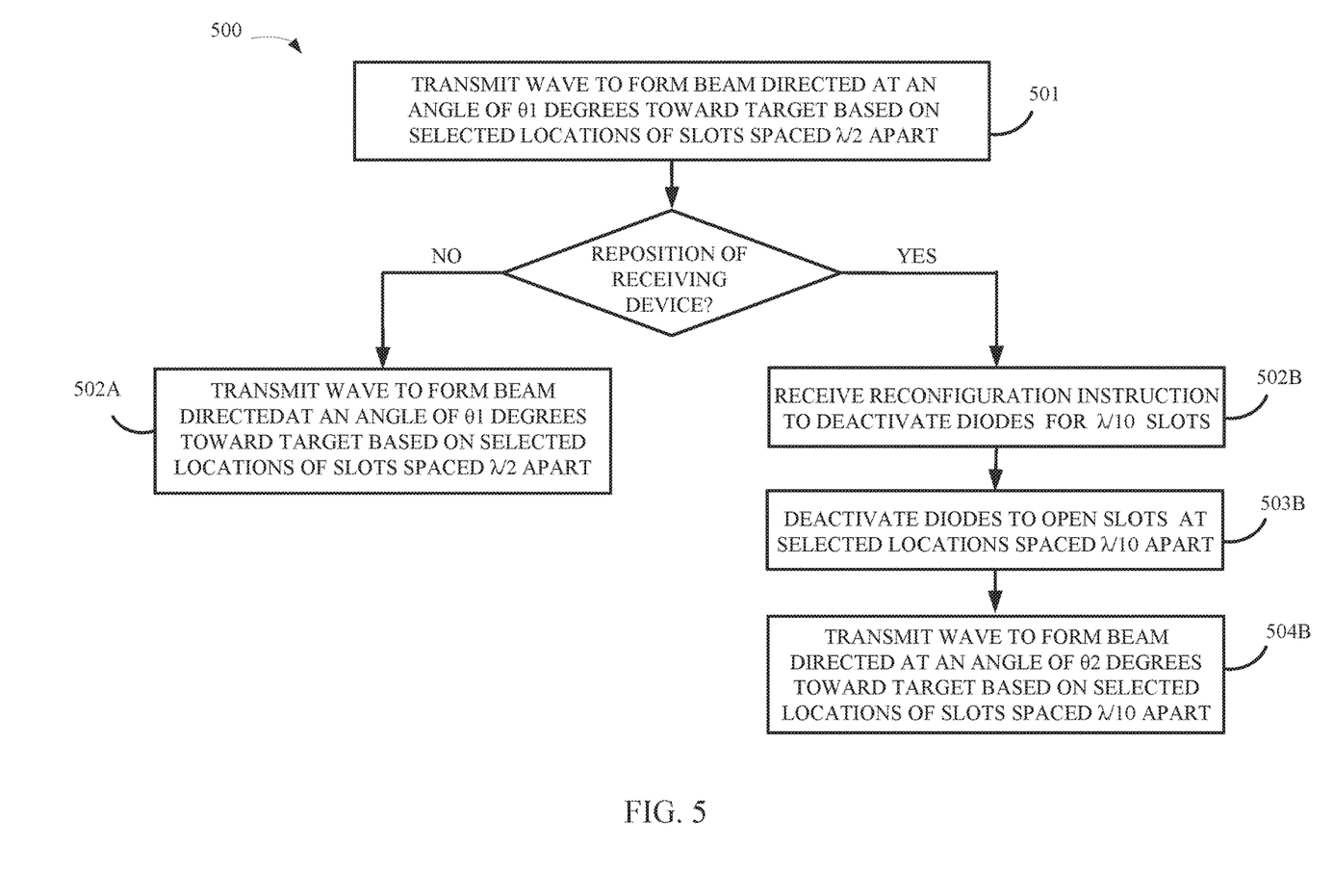
FIG. 5 is a flow diagram illustrating an example wireless transmission environment in accordance with an embodiment.

FIG. 5 depicts a flow diagram illustrating an example of operating rectangular waveguide 401 in wireless transmission system 500, according to some embodiments. In an initial step, rectangular waveguide 401 transmits (501) a wave in a target direction, such as θ1, based at least in part on the locations of the open selected ones of the multiple slots that are spaced 212 apart in rectangular waveguide 401. Rectangular waveguide 401 then determines whether the receiving device has been repositioned. For example, rectangular waveguide 401 may be directed at a receiving device at an angle of θ1 to direct transmissions of wireless communications. If rectangular waveguide 401 determines that the receiving device has not been repositioned, rectangular waveguide 401 continues to transmit (502A) the wave in a target direction, such as θ1, based at least in part on the locations of the open selected ones of the multiple slots that are spaced $\lambda/2$ apart in rectangular waveguide 401.

If rectangular waveguide 401 determines that the receiving device has been repositioned, rectangular waveguide 401 receives (502B) reconfiguration instructions, from the circuit controller, to dynamically deactivate one or more diodes associated with each $\lambda/10$ slot to open selected ones of the multiple slots in waveguide device 401. Rectangular waveguide 401 may be coupled to a processor which computes the locations of the selected ones of the multiple slots in rectangular waveguide 401 based at least on a waveform characteristic and a transmission path of the wave to the receiver device. The processor may then assign, based on the computed locations of the selected ones of the multiple slots, the reconfiguration instruction to dynamically deactivate the one or more diodes to open selected ones of multiple slots at the computed locations rectangular waveguide 401.

The processor may also detect a modification parameter of the waveform characteristic and transmission path of the wave to the receiver device. Additionally, the processor computes, based on the modification parameter, modified locations of the selected ones of the multiple slots in rectangular waveguide 401. Furthermore, the processor may assign, based on the computed modified locations of the selected ones of the multiple slots, the instruction to dynamically deactivate one or more diodes to open selected ones of the multiple slots at the computed modified locations in rectangular waveguide 401. Rectangular waveguide 401 then deactivates (503B) selected diodes to open the slots at each of the $\lambda/10$ slots. Rectangular waveguide 401 then transmits (504B) the wave in a new target direction, such as θ2, based at least in part on the locations of the open selected ones of the multiple slots that are spaced $\lambda/10$ apart in rectangular waveguide 401.

FIG. 6 is a diagram illustrating an example wireless communication signal delivery environment in accordance with an embodiment. The wireless signal delivery environment 600 includes transceiver device 601, a user operating receiver device 602, and wireless network 609. Transmission device 601 can be wireless transmission system 101 depicted in FIG. 1 or wireless power transmission system 300 of FIG. 3, although alternative configurations are possible. Likewise, receiver device 602 can be receiver device 340 of FIG. 3, respectively, although alternative configurations are possible.

Transceiver device 601 includes power supply 603, memory 604, processor 605, one or more antennas (or transceivers) 606 that have a radiation and reception pattern directed in a space proximate to receiver device 602 from waveguide devices 607. Transmission device 601 transmits a wireless communication signal over multiple waveguide devices 607 to receiver device 602. As discussed herein, transceiver device 601 transmits the wireless communication signal at an angle in the direction of receiver device 602 such that the strength of the received communication signal by receiver device 602 depends on the accuracy of the directivity of the beams from waveguide devices 607.

A fundamental property of antennas is that the receiving pattern (sensitivity as a function of direction) of an antenna when used for receiving is identical to the far-field radiation pattern of the antenna when used for transmitting. This is a consequence of the reciprocity theorem in electromagnetics. As shown in the example of FIG. 6, the radiation pattern can be any number of shapes and strengths depending on the directivity of the beam created by the placement of slots along each of waveguide devices 607, the waveform characteristics, and the types of antennas (e.g., horn antennas, simple vertical antenna, etc.) used in the antenna design of antennas 606. For example, the radiation pattern can comprise various directive patterns and any number of different antenna radiation patterns is possible in a wireless communication delivery environment. By way of example and not limitation, the wireless power transmit characteristics can include phase settings for each antenna or transceiver, transmission power settings, etc.

As discussed herein, the transceiver device 601 determines the wireless communication transmit characteristics such that, once the antennas or transceivers are configured, the multiple antennas or transceivers are operable to transmit a wireless power signal that matches the client radiation pattern in the space proximate to the client device. Advantageously, as discussed herein, the wireless communication signal may be adjusted to more accurately direct the beam of the wireless communication signal toward receiver device 602.

The directivity of the radiation pattern shown in the example of FIG. 6 is illustrated for simplicity, it is appreciated that any number of paths can be utilized for transmitting the wireless communication signal to receiver device 602 depending on, among other factors, reflective and absorptive objects in the wireless communication delivery environment.

The positioning and repositioning of receiver device 602 in the wireless communication delivery environment may be tracked by transceiver system 601 using a three-dimensional angle of incidence of an RF signal (at any polarity) paired with a distance determined by using an RF signal strength or any other method. As discussed herein, an array of antennas capable of measuring phase may be used to detect a wavefront angle of incidence. An angle of direction toward receiver device 602 may be determined based on distance to receiver device 602 and on power calculations. Alternatively, or additionally, the angle of direction to receiver device 602 can be determined from multiple array segments.

In some embodiments, the degree of accuracy in determining the angle of direction toward receiver device 602 depends on the size and number of waveguide devices 607, number of antennas 606, number of phase steps, method of phase detection, accuracy of distance measurement method, RF noise level in environment, etc. In some embodiments, users may be asked to agree to a privacy policy defined by an administrator for tracking their location and movements within the environment. Furthermore, in some embodiments, the system can use the location information to modify the flow of information between devices and optimize the environment. Additionally, the system can track historical wireless device location information and develop movement pattern information, profile information, and preference information.

Figure 7:
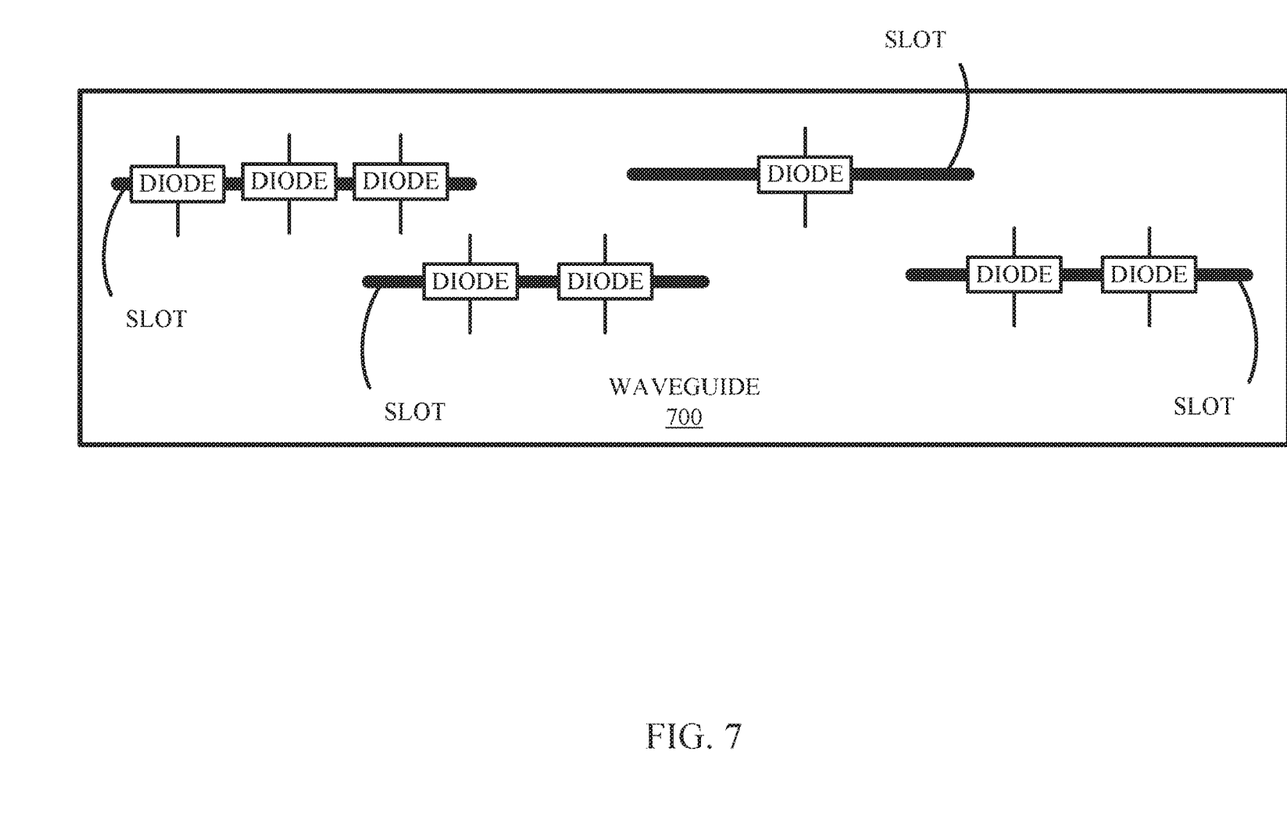
FIG. 7 is a diagram illustrating an example waveguide device to dynamically activate and deactivate switches to open and close slots in accordance with an embodiment.

FIG. 7 is a diagram illustrating an example waveguide device to dynamically activate and deactivate switches to open and close slots in accordance with an embodiment. Waveguide device 700 is an example of waveguide device 101 from FIG. 1, circular slotted-waveguides 310-312 from FIG. 3, rectangular waveguide 401 from FIG. 4, and waveguide devices 607 from FIG. 6, although waveguide device 101, circular slotted-waveguides 310-312, rectangular waveguide 401, and waveguide devices 607 may have alternative configurations. Waveguide 700 includes various slots running parallel to the length of waveguide 700. Each slot contains one or more diodes. The one or more diodes allow each slot to by dynamically opened and closed, in whole or in part. Varying the lengths of the slots can be controlled by utilizing multiple switches for each slot. Different lengths give rise to different resonances and phase delays which affect the shape and angle of the radiation pattern.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A method of operating a waveguide device having multiple slots, each slot having one or more switches, the method comprising:
   receiving, from a circuit controller, an instruction to dynamically deactivate more switches to open selected ones of the multiple slots at determined locations in the waveguide device, and to dynamically activate one or more switches to close selected ones of the multiple slots at determined locations in the waveguide device, wherein the circuit controller is communicatively coupled to each of the switches on the waveguide device; and
   transmitting a wave in a target direction based at least in part on the determined locations of the open selected ones of the multiple slots at the determined locations in the waveguide device.

2. The method of claim 1 wherein the one or more switches for each of the multiple slots comprise one or more diodes for each of the multiple slots.

3. The method in claim 1 further comprising:
   calculating an angle of arrival of an incoming signal; and
   wherein transmitting the wave in the target direction comprises transmitting the wave in the target direction of the calculated angle.

4. The method in claim 1 further comprising receiving phases for a specific configuration of the multiple slots and directing a power wave at a location of a signal transmitting antenna.

5. The method of claim 1 wherein the one or more switches for each of the multiple slots comprise one or more Radio Frequency (RF) Microelectromechanical (MEM) switches for each of the multiple slots.

6. The method of claim 1 wherein transmitting the wave in the target direction based at least in part on the locations of the selected ones of the multiple slots at the determined locations in the waveguide device comprises transmitting a wireless communication signal in the target direction based at least in part on the locations of the selected ones of the multiple slots at the determined locations in the waveguide device.

7. The method of claim 1 wherein transmitting the wave in the target direction based at least in part on the locations of the selected ones of the multiple slots at the determined locations in the waveguide device comprises transmitting a wireless power wave in the target direction based at least in part on the locations of the selected ones of the multiple slots at the determined locations in the waveguide device.

8. The method of claim 1 further comprising:
   computing, by a processor communicatively coupled to the waveguide device, the locations of the selected ones of the multiple slots in the waveguide device based at least on a waveform characteristic and a transmission path of the wave to a receiver device; and
   assigning, by the processor and based on the computed locations of the selected ones of the multiple slots, the instruction to dynamically deactivate the one or more switches to open selected ones of the multiple slots at the computed locations in the waveguide device.

9. The method of claim 8 further comprising:
   detecting, by the processor, a modification parameter of the at least waveform characteristic and transmission path of the wave to the receiver device;
   computing, by the processor and based on the modification parameter, modified locations of the selected ones of the multiple slots in the waveguide device; and
   assigning, by the processor and based on the computed modified locations of the selected ones of the multiple slots, the instruction to dynamically deactivate the one or more switches to open selected ones of the multiple slots at the computed modified locations in the waveguide device.

10. The method of claim 1 wherein the waveguide device the waveguide device comprises one of a rectangular slotted-waveguide, a circular slotted-waveguide, and a substrate integrated-waveguide.

11. A transceiver system including a waveguide device having multiple slots, each slot having one or more switches, said transceiver system comprising:
   a memory; and
   a processor coupled to the memory and coupled to the waveguide device, the processor configured to:
      direct the waveguide device to receive, from a circuit controller, an instruction to dynamically deactivate one or more switches to open selected ones of the multiple slots at determined locations in the waveguide device and to dynamically activate one or more switches to close selected ones of the multiple slots at determined locations in the waveguide device, wherein the circuit controller is communicatively coupled to each of the switches on the waveguide device; and
      direct the waveguide device to transmit a wave in a target direction based at least in part on the determined locations of the open selected ones of the multiple slots at the determined locations in the waveguide device.

12. The transceiver system of claim 11 wherein the one or more switches for each of the multiple slots comprise one or more diodes for each of the multiple slots.

13. The transceiver system of claim 11 wherein:
the processor is further configured to calculate an angle of arrival of an incoming signal; and
wherein the processor configured to direct the waveguide device to transmit the wave in the target direction comprises the processor configured to direct the waveguide device to transmit the wave in the target direction of the calculated angle.

14. The transceiver system of claim 11 wherein the one or more switches for each of the multiple slots comprise one or more Radio Frequency (RF) Microelectromechanical (MEM) switches for each of the multiple slots.

15. The transceiver system of claim 11 wherein the processor configured to direct the waveguide to transmit the wave in the target direction based at least in part on the locations of the selected ones of the multiple slots at the determined locations in the waveguide device comprises the processor configured to direct the waveguide to transmit a wireless communication signal in the target direction based at least in part on the locations of the selected ones of the multiple slots at the determined locations in the waveguide device.

16. The transceiver system of claim 11 wherein the processor configured to direct the waveguide to transmit the wave in the target direction based at least in part on the locations of the selected ones of the multiple slots at the determined locations in the waveguide device comprises the processor configured to direct the waveguide to transmit a wireless power wave in the target direction based at least in part on the locations of the selected ones of the multiple slots at the determined locations in the waveguide device.

17. The transceiver system of claim 11 wherein the processor is further configured to:
compute the locations of the selected ones of the multiple slots in the waveguide device based at least on a waveform characteristic and a transmission path of the wave to a receiver device; and
assign, based on the computed locations of the selected ones of the multiple slots, the instruction to dynamically deactivate the one or more switches to open selected ones of the multiple slots at the computed locations in the waveguide device.

18. The transceiver system of claim 17 wherein the processor is further configured to:
detect a modification parameter of the at least waveform characteristic and transmission path of the wave to the receiver device;
compute, based on the modification parameter, modified locations of the selected ones of the multiple slots in the waveguide device; and
assign, based on the computed modified locations of the selected ones of the multiple slots, the instruction to dynamically deactivate the one or more switches to open selected ones of the multiple slots at the computed modified locations in the waveguide device.

19. The transceiver system of claim 11 wherein the waveguide device comprises one of a rectangular slotted-waveguide, a circular slotted-waveguide, and a substrate integrated-waveguide.

20. One or more non-transitory computer-readable storage media having stored thereon processor-executable program instructions which, when executed by a processor of a transceiver system including a waveguide device, having multiple slots, each slot having one or more switches, coupled to the processor, cause the processor to:
direct each the waveguide device to receive, from a circuit controller, an instruction to dynamically deactivate one or more switches to open selected ones of the multiple slots at determined locations in the waveguide device and to dynamically activate one or more switches to close selected ones of the multiple slots at determined locations in the waveguide device, wherein the circuit controller is communicatively coupled to each of the switches on the waveguide device; and
direct the waveguide device to transmit a wave in a target direction based at least in part on the determined locations of the open selected ones of the multiple slots at the determined locations in the waveguide device.

* * * * *

UNITED STATES PATENT AND TRADEMARK OFFICE
CERTIFICATE OF CORRECTION

PATENT NO. : 10,256,550 B2
APPLICATION NO. : 15/690489
DATED : April 9, 2019
INVENTOR(S) : Hatem Ibrahim Zeine et al.

It is certified that error appears in the above-identified patent and that said Letters Patent is hereby corrected as shown below:

In the Specification

Column 4, Line 13, delete "(212)" and insert --($\lambda/2$)--

Column 8, Line 15, delete "212" and insert --$\lambda/2$--

In the Claims

Column 13, Claim 1, Line 44, after "deactivate" insert --one or more--

Signed and Sealed this
Twenty-seventh Day of August, 2019

Andrei Iancu
*Director of the United States Patent and Trademark Office*